(12) United States Patent
Yamagata

(10) Patent No.: US 8,081,869 B2
(45) Date of Patent: Dec. 20, 2011

(54) TIME-VARYING IMAGE RECORDING DEVICE

(75) Inventor: Naoki Yamagata, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 1400 days.

(21) Appl. No.: 11/382,549

(22) Filed: May 10, 2006

(65) Prior Publication Data

US 2006/0262658 A1 Nov. 23, 2006

(30) Foreign Application Priority Data

May 19, 2005 (JP) .............................. P2005-146324

(51) Int. Cl.
*H04N 5/94* (2006.01)
(52) U.S. Cl. ...................................................... 386/263
(58) Field of Classification Search ......................... None
See application file for complete search history.

(56) References Cited

U.S. PATENT DOCUMENTS

| 5,532,740 | A | 7/1996 | Wakui |
| 6,553,180 | B1 * | 4/2003 | Kikuchi et al. ............... 386/95 |
| 2001/0043804 | A1 * | 11/2001 | Nakatani et al. ............. 386/126 |

FOREIGN PATENT DOCUMENTS

WO WO 0135406 A1 * 5/2001

OTHER PUBLICATIONS

U.S. Appl. No. 11/420,871 to Ishibashi et al., filed May 30, 2006.
U.S. Appl. No. 11/422,102 to Ishibashi et al., filed Jun. 5, 2006.

* cited by examiner

*Primary Examiner* — William Vaughn, Jr.
*Assistant Examiner* — Tat Chio
(74) *Attorney, Agent, or Firm* — Greenblum & Bernstein, P.L.C.

(57) ABSTRACT

A time-varying image recording device controls a recording operation for recording time-varying image data in a recording medium. The time-varying image data is sequentially recorded in blocks, and block information containing the total number of blocks and so on is recorded after a series of blocks. It is determined whether a recording process result for the time-varying image data is normal or not. A block information recording capacity, which is a capacity that is necessary to record block information, is obtained based on the number of blocks already recorded in the recording medium, when the recording process result is abnormal. An address of the recording medium, at which the block information should be recorded, is sensed in accordance with the block information recording capacity.

13 Claims, 5 Drawing Sheets

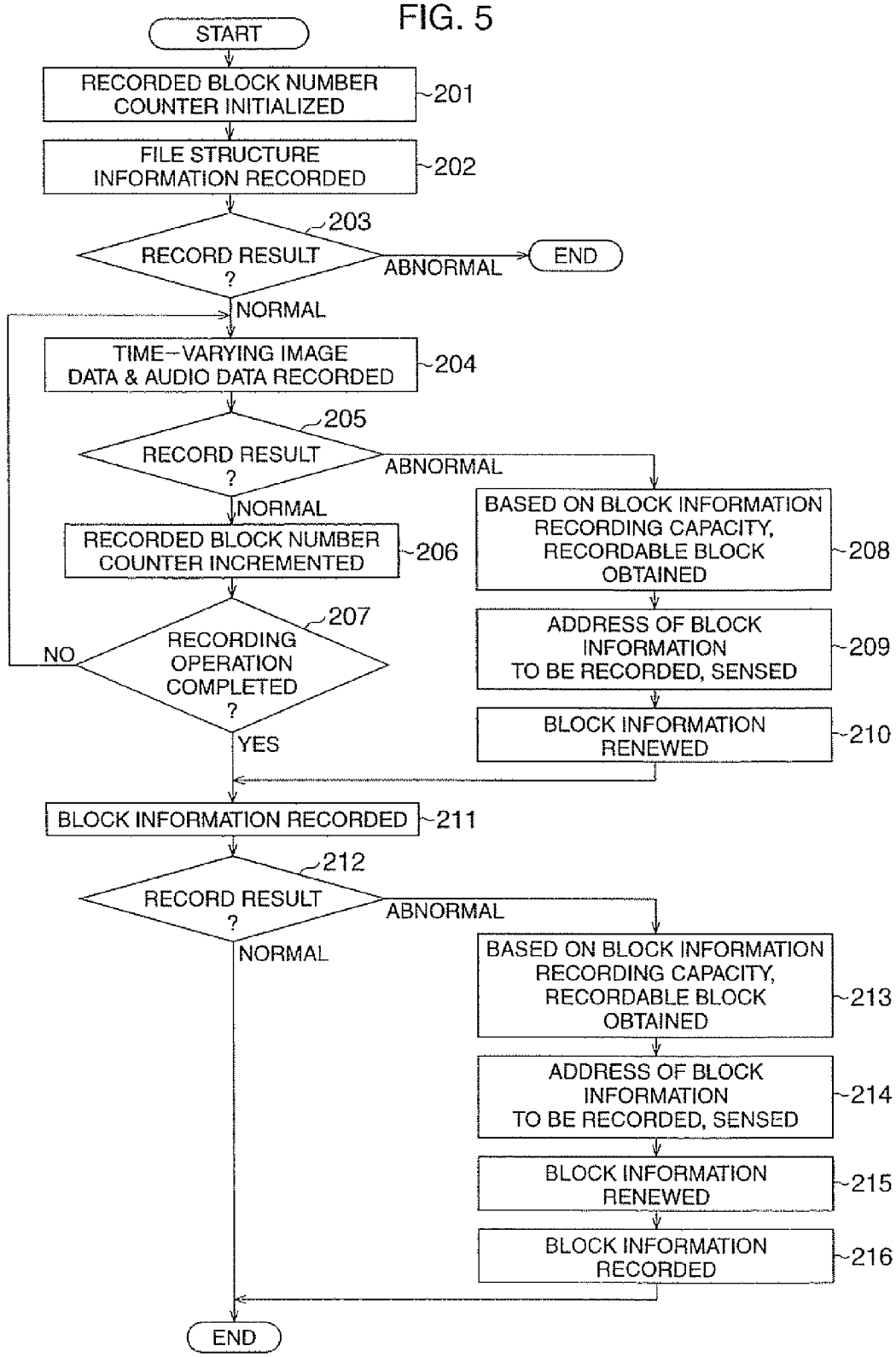

TIME-VARYING IMAGE RECORDING DEVICE

BACKGROUND OF THE INVENTION

1. Field of the Invention

The present invention relates to a time-varying image recording device, which is provided in a movie camera that records an image in a digital form, to record time-varying image data in a recording medium.

2. Description of the Related Art

Conventionally, in a time-varying image recording device of a digital type, a series of time-varying image data, i.e., one moving-image file or one motion-image file, is sequentially recorded in blocks, corresponding to a predetermined unit time, in a recording medium. In the recording medium, block information, such as a starting position of a recording area, in which each block is recorded, and a size of the recording area, is recorded at the end portion of the moving-image file. When the moving-image file is reproduced, first, the contents of the block information are read, and then the time-varying image data corresponding to the moving-image file, are read out based on the block information.

Thus, the block information is essential for reproducing moving-image file, and if the block information is lacking, the moving-image file cannot be reproduced. The lack of the block information occurs when an inferior recording area (or a defective area) exists in the recording medium. In such a case, if the recording operation is attempted and data is recorded in the inferior recording area before the recording operation is completed, the recording operation cannot be completed.

SUMMARY OF THE INVENTION

Therefore, an object of the present invention is to provide a time-varying image recording device by which, even when a recording operation for a single moving-image file cannot be completed because of the existence of the inferior recording area in the recording medium, as much as possible of the time-varying image data is recorded, so that the moving-image file can be reproduced.

According to the present invention, there is provided a time-varying image recording device that controls a recording operation for recording time-varying image data in a recording medium. In the recording medium, the time-varying image data is sequentially recorded in blocks having a predetermined unit time, and block information containing the total number of blocks, a starting position of a recording area in which each of the blocks is recorded, and a size of each of the recording areas, is recorded after the series of the blocks of the time-varying image data. The time-varying image recording device comprises a data recording processor, a recording process result determination processor, a recording capacity obtaining processor, and a sensing processor.

The data recording processor records time-varying image data for each block, in the recording medium. The recording process result determination processor determines whether the result of the recording process obtained by the data recording processor is normal or not. The recording capacity obtaining processor obtains a block information recording capacity, which is a memory capacity necessary for recording block information, based on the number of blocks already recorded in the recording medium, when the result of the recording process is abnormal. The sensing processor senses an address of the recording medium, at which the data recording processor should record the block information, in accordance with the block information recording capacity.

Further, according to the present invention, there is provided a time-varying image recording device that controls a recording operation for recording time-varying image data in a recording medium. In the recording medium, the time-varying image data is sequentially recorded in blocks having a predetermined unit time, and block information needed for reproducing the time-varying image data, is then recorded after a series of the blocks of the time-varying image data. The time-varying image recording device comprises a data recording processor, a recording process result determination processor, and a block information recording processor.

The data recording processor records time-varying image data for each block in the recording medium. The recording process result determination processor determines whether a result of a recording process executed by the data recording processor is normal or not. When the recording process result determination processor determines the result to be abnormal, the block information recording processor reduces the total quantity of the time-varying image data so that the block information can be recorded, and records the block information next to the last block of the time-varying image data.

BRIEF DESCRIPTION OF THE DRAWINGS

The objects and advantages of the present invention will be better understood from the following description, with reference to the accompanying drawings in which:

FIG. 5 is a flowchart indicating a recording operation of a moving-image, in a second embodiment.

DESCRIPTION OF THE PREFERRED EMBODIMENTS

Figure 1:
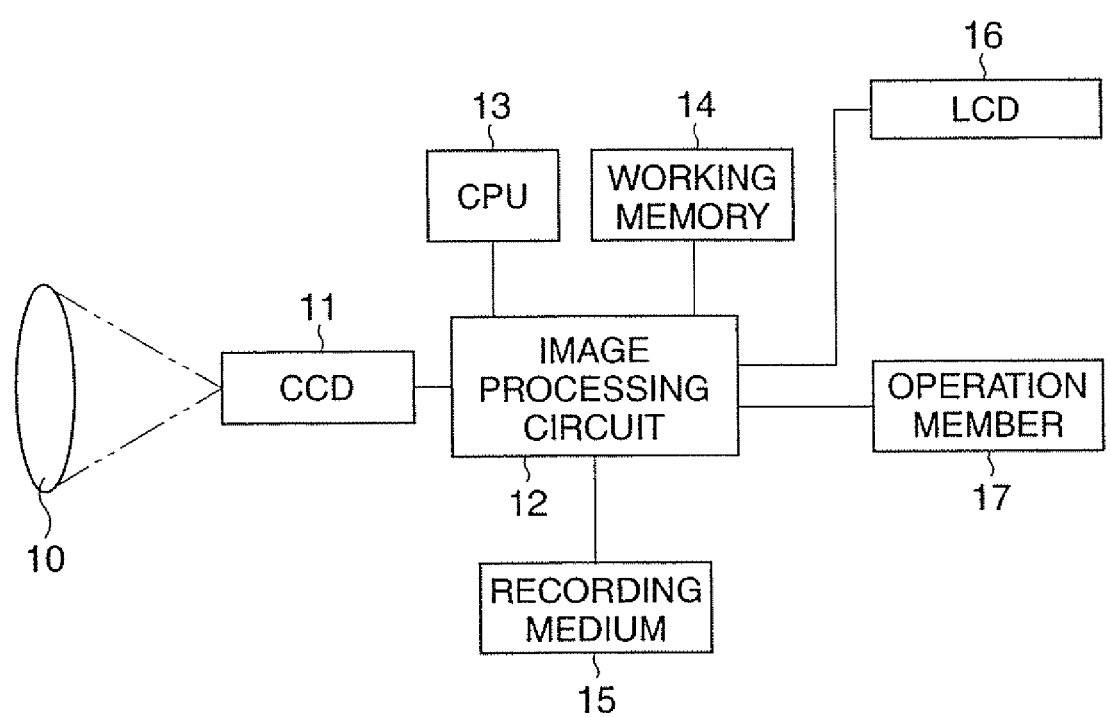
FIG. 1 is a block diagram showing a general construction of a time-varying image recording device of a first embodiment of the present invention.

The present invention will be described below with reference to the embodiments shown in the drawings.

FIG. 1 is a block diagram showing a general construction of a time-varying image recording device of a first embodiment of the present invention. In the embodiment, although the time-varying image recording device is provided in a movie camera, the device can be mounted in a still camera, which can also record a moving image. In either case, a time-varying image is recorded in a recording medium in a digital format.

An imaging device 11, provided on the optical axis of the photographing optical system 10, is a CCD, for example. In the imaging device 11, an analogue image signal is generated, in accordance with a subject image formed on a light-receiving surface thereof. The analogue image signal is A/D-converted to a digital image data by an A/D-converter (not shown), and is input to an image processing circuit 12.

The image processing circuit 12 is controlled by a CPU 13. Namely, the image data is temporarily stored in a working memory 14, and is then read out so that the image data is subjected to image processing such as a compression process according to the MPEG4, for example. The image data, (i.e., time-varying image data) after being subjected to the image process, is sequentially recorded in blocks in a recording medium (an SD card as a removable recording medium or a hard disk device as an internal recording medium, for example) 15, together with audio data obtained through an audio sensing circuit (not shown), as described later.

Further, after the image data input to the image processing circuit 12 is temporarily stored in a working memory 14, the image data is input to an LCD monitor 16, so that the subject is shown as a moving-image on the monitor 16.

For indicating a moving-image on the monitor 16, and recording the image in the recording medium 15, an operation member 17 provided with various kinds of switches, is connected to the image processing circuit 12.

Figure 2:
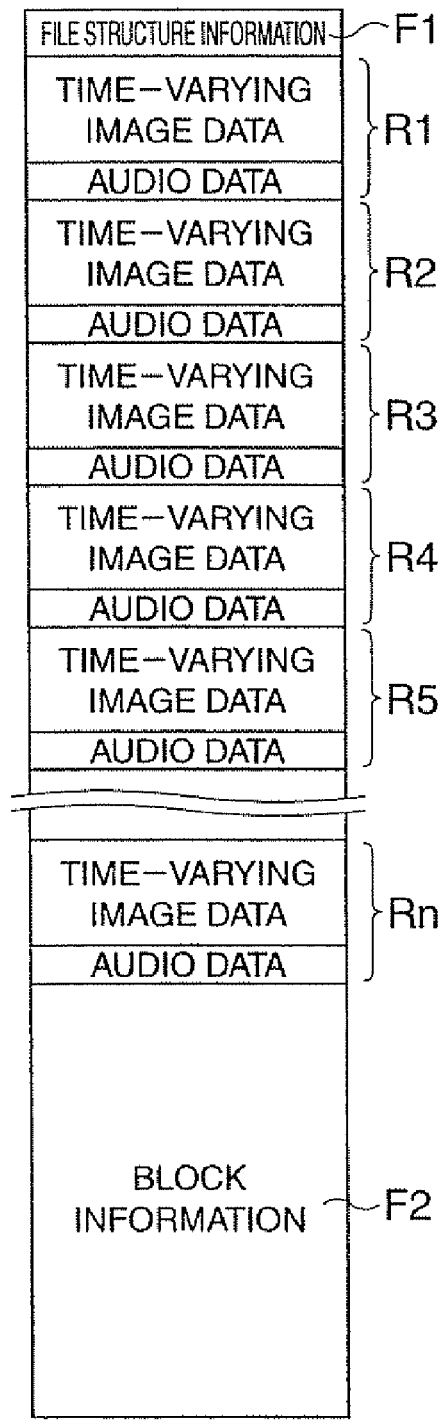
FIG. 2 is a view showing a structure of a series of time-varying image data recorded in a recording medium.

FIG. 2 shows a data structure of the time-varying image data recorded in the recording medium 15. At the beginning of a moving-image file, file structure information F1, such as the compression method used for compressing the image data, and the existence of audio data, is recorded. Subsequent to the file structure information F1, lots of blocks R1, R2, R3, . . . Rn, each of which is composed of a pair of time-varying image data and audio data, are recorded. The time-varying image data and the audio data in each block have data sizes corresponding to a predetermined unit time, such as 0.5 sec or 1.0 sec.

A single moving-image file has the volume corresponding to the photographing time of the moving-image, and thus, the number of blocks R1, R2, . . . Rn is changed depending upon the photographing time. Accordingly, for properly reproducing a single moving-image file, block information F2 containing a starting position of a recording area in which each of the blocks is recorded, a size of each of the blocks, and the total number of the blocks, is recorded at the end portion of the moving-image file, i.e., after the series of the blocks. The block information F2 is temporarily stored in a working memory 14, and is always renewed to the newest information. After the moving-image photography is completed, and the last block is recorded in the recording medium 15, the block information F2 is read out from the working memory 14, and recorded in the recording medium 15.

Figure 3:
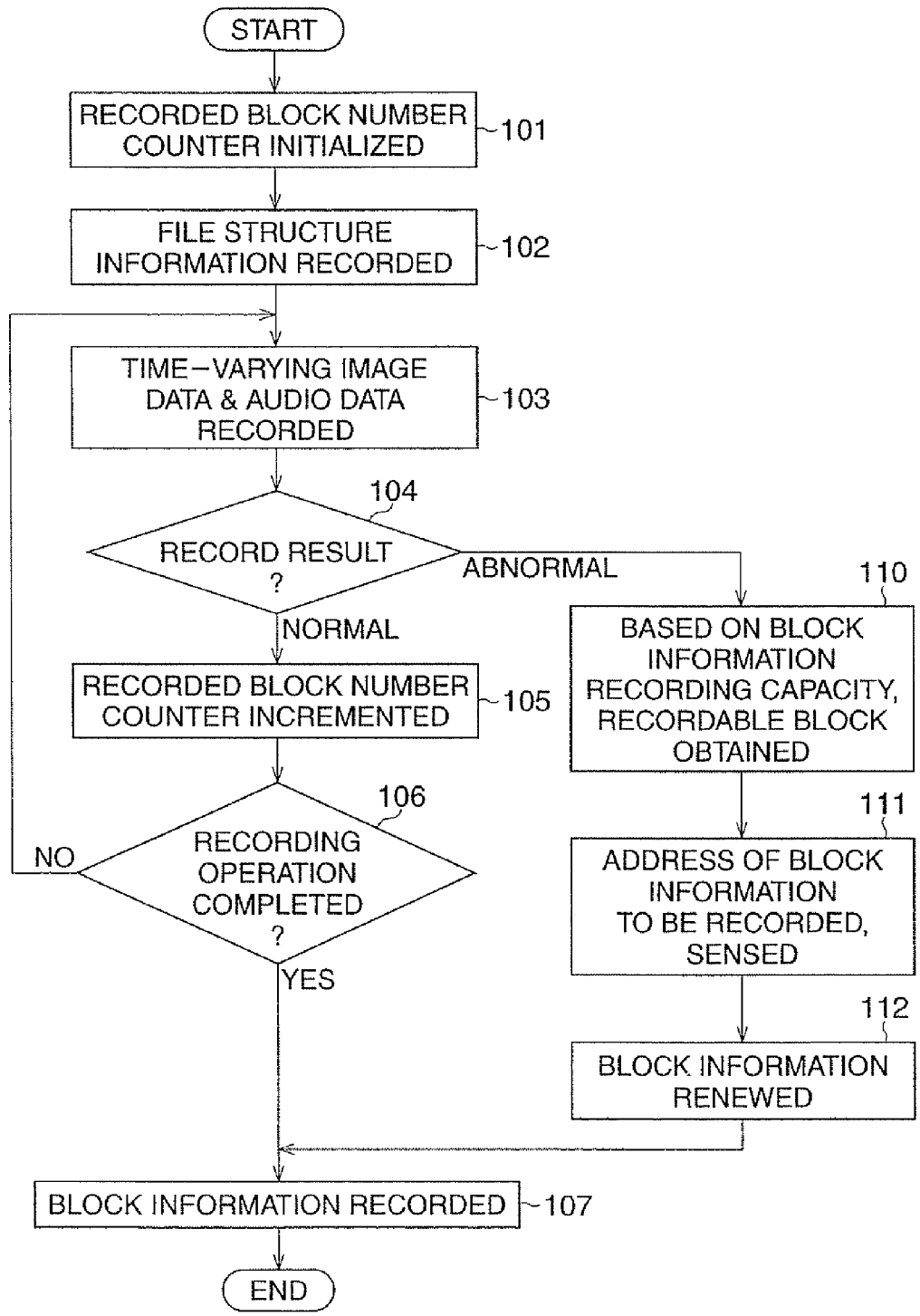
FIG. 3 is a flowchart indicating a recording operation of a moving-image, in the first embodiment.

With reference to FIG. 3, a recording operation of a moving-image in the recording medium 15, which is controlled by the CPU 13, is described.

In Step 101, a counter indicating the number of recorded blocks (i.e., a recorded block number counter) is initialized. In Step 102, file structure information F1 is recorded in a predetermined area of the recording medium 15.

In Step 103, time-varying image data and audio data, corresponding to the predetermined unit time, are recorded in one block. In Step 104, it is determined whether the recording process result of Step 103 was normal or not. When the recording operation is carried out normally, the process goes to Step 105, in which the recorded block number counter is incremented by one, and it is determined in Step 106 whether the recording operation has been completed. Thus, the recording process result is determined for every block. So long as an end signal, generated due to an operation of the operation member 17, is not transmitted from the operation member 17, the recording operation is continued, and thus, the process described above is repeated, so that the time-varying image data is recorded for each block, in the recording medium 15.

When the photographing operation is completed so that an end signal is transmitted, the process goes from Step 106 to Step 107, in which block information F2 is written in the recording medium 15, and the recording operation for a series of time-varying image data, which forms a single moving-image file, is completed. Thus, Steps 104, 105, 106, and 107 are executed in this order, when no data is recorded in an inferior recording area during a recording operation for a single moving-image file, and the moving-image file shown in FIG. 2 is obtained. Namely, the time-varying image data and the audio data are sequentially recorded in blocks having a unit time in the moving-image file, in sequential order based on elapsed time.

Figure 4:
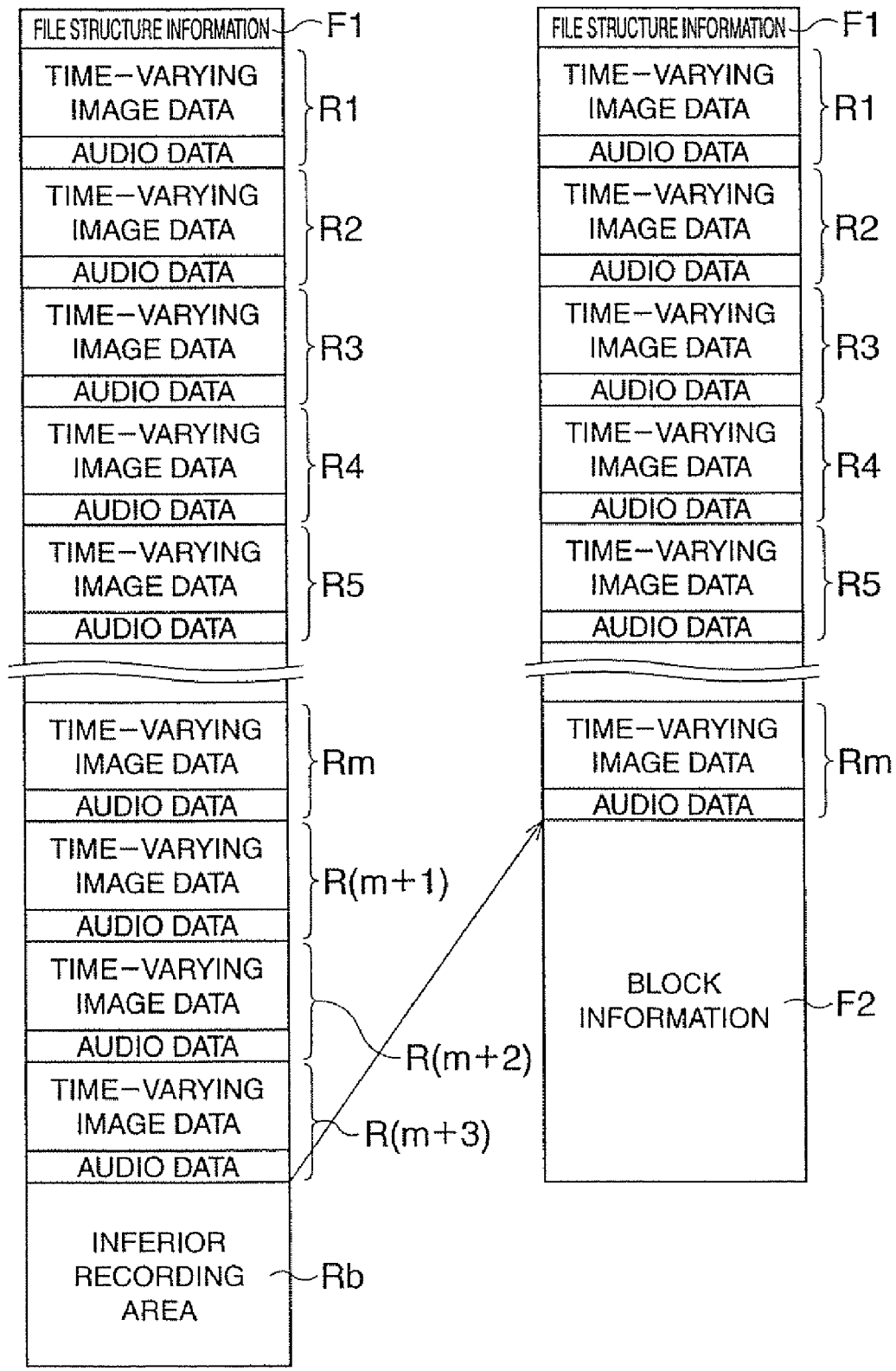
FIG. 4 is view showing a structure of time-varying image data in a case where the block information is recorded when an inferior recording area exists in a recording medium.

Conversely, when it is determined in Step 104 that the recording process result is abnormal, i.e., when data has been attempted to be recorded in an inferior recording area during the recording operation, the process is performed as follows. In this example, it is supposed that, as shown in FIG. 4, blocks R1, R2, . . . Rm, R(m+1), R(m+2), R(m+3) have been recorded in the recording medium 15. Namely, a recording area, with an address following the recording area corresponding to the block R(m+3), is an inferior recording area Rb, in which a recording operation cannot be carried out.

In this case, the process goes from Step 104 to Step 110, where a block information recording capacity, which is a memory capacity that is necessary to record the block information F2, is obtained based on the number of recorded blocks indicated by the counter obtained in Step 105. Here, it is supposed that the block information recording capacity is three. Namely, in Step 110, the three block's worth of block information is formed or maintained, so that the blocks R1, R2, . . . Rm become recordable. In Step 111, from the address to which the last block R(m+3), at which the record result has been normal, corresponds, the address goes back by the number of blocks (i.e., 3 blocks) which satisfies the block information recording capacity, so that an address of the recording medium 15, at which the block information F2 should be recorded, is sensed. In Step 112, the block information relating to the three blocks R(M+1), R(m+2), and R(m+3) is then deleted in the working memory 14, and the block information F2 is renewed to that corresponding to the block R1 through the block Rm.

Then, in Step 107, the block information F2 is recorded at the address of the recording medium 15, which was obtained in Step 111, and thus, the recording operation ends Thus, when the recording result is abnormal, the total quantity of the time-varying image data is reduced so that the block information can be recorded, and the block information is recorded next to the last block of the time-varying image data.

As described above, when an inferior recording area is accessed during a recording operation, recording areas corresponding to some blocks, which are immediately before the inferior recording area, are used for recording not image data and audio data, but the block information F2. Due to this, the blocks R1, R2, . . . Rm, which have been recorded so far, become properly reproduced. Further, even if there is no inferior recording area, when the amount of compressed data of the image file (i.e., the amount of data which is to be recorded in the recording medium) exceeds prediction, and time-varying image data is recorded up to the capacity of the recording medium 15, the block information F2 is recorded in the recording medium 15 so that a moving-image can be reproduced.

FIG. 5 is a flowchart indicating a recording operation of a moving-image, in a second embodiment. Operations, which are not indicated in this flowchart, and a construction of hardware, are identical with those of the first embodiment.

The contents of Steps 201 and 202 are the same as those of Steps 101 and 102 of FIG. 3. In Step 203, it is determined whether the recording process result of the file structure information F1 in Step 202 is normal. When the recording process result is abnormal, the recording operation immediately ends.

Conversely, when it is determined in Step 203 that the recording operation is normal, the process goes to Step 204. The contents of Steps 204 through 210 are respectively identical with those of Steps 103, 104, 105, 106, 110, 111, and 112.

After it is determined in Step 207 that the recording operation has been completed, or after the block information F2 is renewed in Step 210, Step 211 is executed, in which the block information F2 is recorded. It is then determined in Step 212 whether the recording operation of the block information F2, carried out in Step 211, was normal. In the case of a normal recording, the recording operation of the moving-image file immediately ends. Conversely, in the case of an abnormal recording, Steps 213 through 216 are executed.

In Step 213, in a similar way as in Step 208, a block information capacity is again obtained based on the number of blocks which have been already recorded in the recording medium 15. In Step 214, in a similar way as Step 209, the address is moved back by the amount of block information recording capacity, so that an address of the recording medium 15, at which the block information F2 should be recorded, is sensed. In Step 215, in a similar way as in Step 112, the block information F2 is renewed to the newest block information F2, which corresponds to the blocks R1 though Rm, in the working memory 14. In Step 216, the block information F2 is then recorded in the recording medium 15, Thus, the recording operation of the moving-image file is completed.

As described above, according to the second embodiment, it is determined whether the recording operation of the block information F2 is normal or not, and when the recording operation is abnormal, the block information recording capacity is again obtained. Therefore, in comparison with the first embodiment, a possibility, in which the block information F2 is recorded, is raised.

Note that, in the first and second embodiments, every time the time-varying image data and audio data are recorded, i.e., at every recording operation for one block, it is determined whether the recording process result is normal or not. However, the determination process can be performed for recording operations of more than one block.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-146324 (filed on May 19, 2005) which is expressly incorporated herein, by reference, in its entirety.

The invention claimed is:

1. A time-varying image recording device that controls a recording operation for recording time-varying image data in a recording medium, in which said time-varying image data is sequentially recorded in blocks having a predetermined unit time, and block information containing the total number of said blocks, a starting position of a recording area in which each of said blocks is recorded, and a size of each of said recording areas, is then recorded after a series of said blocks of said time-varying image data, said time-varying image recording device comprising:

a data recording processor that records time-varying image data for each block, in said recording medium;

a recording process result determination processor that determines whether a result of a recording process obtained by said data recording processor is normal or abnormal;

a recording capacity obtaining processor that obtains a block information recording capacity, which is a capacity that is necessary to record block information, based on the number of blocks already recorded in said recording medium, when the recording process result is abnormal;

a sensing processor that senses an address of said recording medium, at which said data recording processor records said block information, in accordance with said block information recording capacity; and a block information recording processor that records said block information at said address sensed by said sensing processor;

wherein when the recording process result determination processor determines that the result of recording process of (n+1)-th block is abnormal, said recording capacity obtaining processor calculates a memory size of the block information for n blocks, in which time-varying data has been stored by the data recording processor, and the result of the recording process of each of the n blocks is determined normal, said sensing processor determines that m blocks are necessary to store the calculated memory size of the block information, and determines an address of (n−m+1)-th block as the sensed address of the recording medium, at which said data recording processor starts recording the block information, and said block information recording processor records the block information for n−m blocks, from the address of (n−m+1)-th block.

2. A time-varying image recording device according to claim 1, wherein said recording process result determination processor determines the recording process result obtained by said data recording processor, for every block.

3. A time-varying image recording device according to claim 1, further comprising a memory in which said block information is temporarily stored.

4. A time-varying image recording device according to claim 1, wherein an audio data corresponding to said time-varying image data is recorded in said recording area.

5. A time-varying image recording device according to claim 1, wherein said time-varying image data is compressed and then recorded in said recording medium.

6. A time-varying image recording device according to claim 1, further comprising an information recording determination processor that determines whether a recording operation of said block information recording processor is normal or abnormal.

7. A time-varying image recording device according to claim 6, wherein said recording capacity obtaining processor again obtains said block information recording capacity, based on the number of blocks already recorded in said recording medium, when a recording operation result of said block information recording processor is abnormal.

8. The time-varying image recording device according to claim 1, wherein the block information recording processor overwrites said block information on the time-varying image recorded in the second address, so that the time-varying image recorded in the sensed address is discarded.

9. The time-varying recording device according to 1, wherein a block of the recording medium that physically follows the block where the block information is stored, does not record the time-varying image data.

10. A time-varying image recording device that controls a recording operation for recording time-varying image data in a recording medium, in which said time-varying image data is sequentially recorded in blocks having a predetermined unit time, and block information needed for reproducing said time-varying image data, is then recorded after a series of said blocks of said time-varying image data, said time-varying image recording device comprising:

- a data recording processor that records time-varying image data for each block, in said recording medium;
- a recording process result determination processor that determines whether a result of a recording process executed by said data recording processor is normal or abnormal; and
- a block information recording processor that, when said recording process result determination processor determines said result to be abnormal, reduces the total quantity of said time-varying image data by a number of blocks corresponding to a capacity required to store the block information, so that said block information can be recorded, and records said block information next to a last block of said time-varying image data of the reduced quantity,
- wherein said block information recording processor records said block information at an address sensed by a sensing processor;
- wherein when the recording process result determination processor determines that the result of recording process of (n+1)-th block is abnormal, a recording capacity obtaining processor calculates a memory size of the block information for n blocks, in which time-varying data has been stored by the data recording processor, and the result of the recording process of each of the n blocks is determined normal,
- said sensing processor determines that m blocks are necessary to store the calculated memory size of the block information, and determines an address of (n−m+1)-th block as the sensed address of the recording medium, at which said data recording processor starts recording the block information, and
- said block information recording processor records the block information for n−m blocks, from the address of (n−m+1)th block.

11. The time-varying image recording device according to claim 10, wherein the block information recording processor reduces the total quantity of the time-varying image by discarding the number of blocks of the time-varying image data recorded in the recording medium, on which the block information is overwritten.

12. The time-varying image recording device according to claim 10, further comprising:

- a recording capacity calculating processor that calculates the size of the block information to be stored in the recording medium, and obtains the number of block corresponding to the calculated size,
- wherein the block information recording processor reduces the total quantity of the time-varying image data by the number of blocks corresponding to the calculated size.

13. The time-varying image recording device according to claim 10, wherein a block of the recording medium that physically follows the block where the block information is stored by the block information recording processor does not record the time-varying image data.

* * * * *